United States Patent [19]

Schwendeman et al.

[11] Patent Number: 5,257,019
[45] Date of Patent: Oct. 26, 1993

[54] SATELLITE SELECTIVE CALL SIGNALLING SYSTEM

[75] Inventors: Robert J. Schwendeman, Pompano Beach; Michael J. DeLuca, Boca Raton, both of Fla.

[73] Assignee: Motorola, Inc., Schaumburg, Ill.

[21] Appl. No.: 824,755

[22] Filed: Jan. 17, 1992

Related U.S. Application Data

[63] Continuation-in-part of Ser. No. 431,410, Nov. 3, 1989, abandoned.

[51] Int. Cl.⁵ ............................................. H04Q 7/00
[52] U.S. Cl. ........................... 340/825.49; 340/825.44; 340/825.47; 455/38.1
[58] Field of Search ....................... 340/825.44, 825.47, 340/825.48, 825.49, 311.1; 379/56, 57, 59, 63; 455/12.1, 33.1, 38.1, 54.1, 56.1

[56] References Cited

U.S. PATENT DOCUMENTS

| | | | |
|---|---|---|---|
| 3,836,726 | 9/1974 | Wells et al. | 340/825.44 |
| 4,178,476 | 12/1987 | Frost | 340/825.49 |
| 4,449,248 | 4/1984 | Leslie et al. | 455/38 |
| 4,644,347 | 2/1989 | Lucas et al. | 340/825.44 |
| 4,668,949 | 5/1987 | Akahori et al. | 340/825.47 |
| 4,804,954 | 2/1989 | Macnak et al. | 340/825.44 |
| 4,831,373 | 5/1989 | Hess | 340/805.44 |
| 4,839,641 | 6/1989 | Mori et al. | 340/825.47 |
| 4,849,750 | 7/1989 | Andras et al. | 340/825.48 |
| 4,914,647 | 4/1990 | Schwendeman et al. | 340/825.44 |
| 4,916,539 | 4/1990 | Galumbeck | 340/825.47 |
| 4,918,437 | 4/1990 | Jasinski et al. | 340/825.44 |

FOREIGN PATENT DOCUMENTS

| | | |
|---|---|---|
| 57-41044 | 3/1982 | Japan . |
| 57-41045 | 3/1982 | Japan . |
| 8700994 | 2/1987 | World Int. Prop. O. ...... 340/825.44 |

Primary Examiner—Donald J. Yusko
Assistant Examiner—Edwin C. Holloway, III
Attorney, Agent, or Firm—Philip P. Macnak; Thomas G. Berry; Daniel R. Collopy

[57] ABSTRACT

A signalling system provides for efficient reception of message by a plurality of Earth based selective call receivers such as pagers. The signals are transmitted from satellites in orbit above the Earth. Each satellite includes a multiple lobe antenna capable of transmitting messages to a selected portion of the surface of the Earth. Methods for conserving satellite transmission power in the communication of message information are described. Furthermore, a signalling protocol transmitted by the satellite provides for power conservation by Earth based selective call receivers. Additionally, a method enabling an area of the Earth to receive messages from multiple satellites is described.

11 Claims, 10 Drawing Sheets

SATELLITE SELECTIVE CALL SIGNALLING SYSTEM

This is a continuation-in-part of application Ser. No. 07/431,410, filed Nov. 3, 1989, now abandoned.

BACKGROUND OF THE INVENTION

This invention generally relates to the area of selective call signalling systems More specifically, this invention relates to a signalling system of communicating from an orbiting satellite to a plurality of selective call paging receivers, and a method for conserving power at the satellite transmitter and the paging receiver With the advent of lower cost satellite transmitters and improvements in satellite technology, it is feasible to construct a system wherein selective call receivers such as pagers directly receive messages from satellite transmitters. In such a system, it is desirable for satellite transmitters to have a power conservation means in order to provide reliable service. Power is collected for satellite transmitters through solar cells and is used for transmitting signals. However, there are portions of the satellite orbit where the Earth shades the solar collectors. Thus, power must be stored in batteries aboard the satellite during these intervals. It is desirable to make these batteries as small as possible, thus it is desirable to provide a method of transmitting selective call signals which conserves power. Additionally, paging signals. Pagers being small and portable also require battery saving methods to provide acceptable battery life.

SUMMARY OF THE INVENTION

In accordance with the preferred embodiment of the present invention, a satellite based transmission system includes a satellite having a directing means for directing, in a predetermined sequence, the synchronous transmission of selective call messages to a plurality of geographic areas corresponding to a sequence of transmission time intervals. The satellite based transmission system comprises identifying means, encoding means and transmitting means. The identifying means identifies message traffic levels for selective call receivers operating in each of the geographic areas, and generates at least a first receiver control signal in response thereto when the message traffic level for a particular geographic area exceeds a predetermined message traffic level. The encoding means encodes the selective call messages to include the first receiver control signal which is transmitted by the transmitting means to the satellite. The directing means is then responsive to the first receiver control signal for directing to the particular geographic area the transmission of a portion of the selective call messages directed thereto during at least a portion of the transmission time interval assigned for another geographic area.

DESCRIPTION OF THE INVENTION

Figure 1:
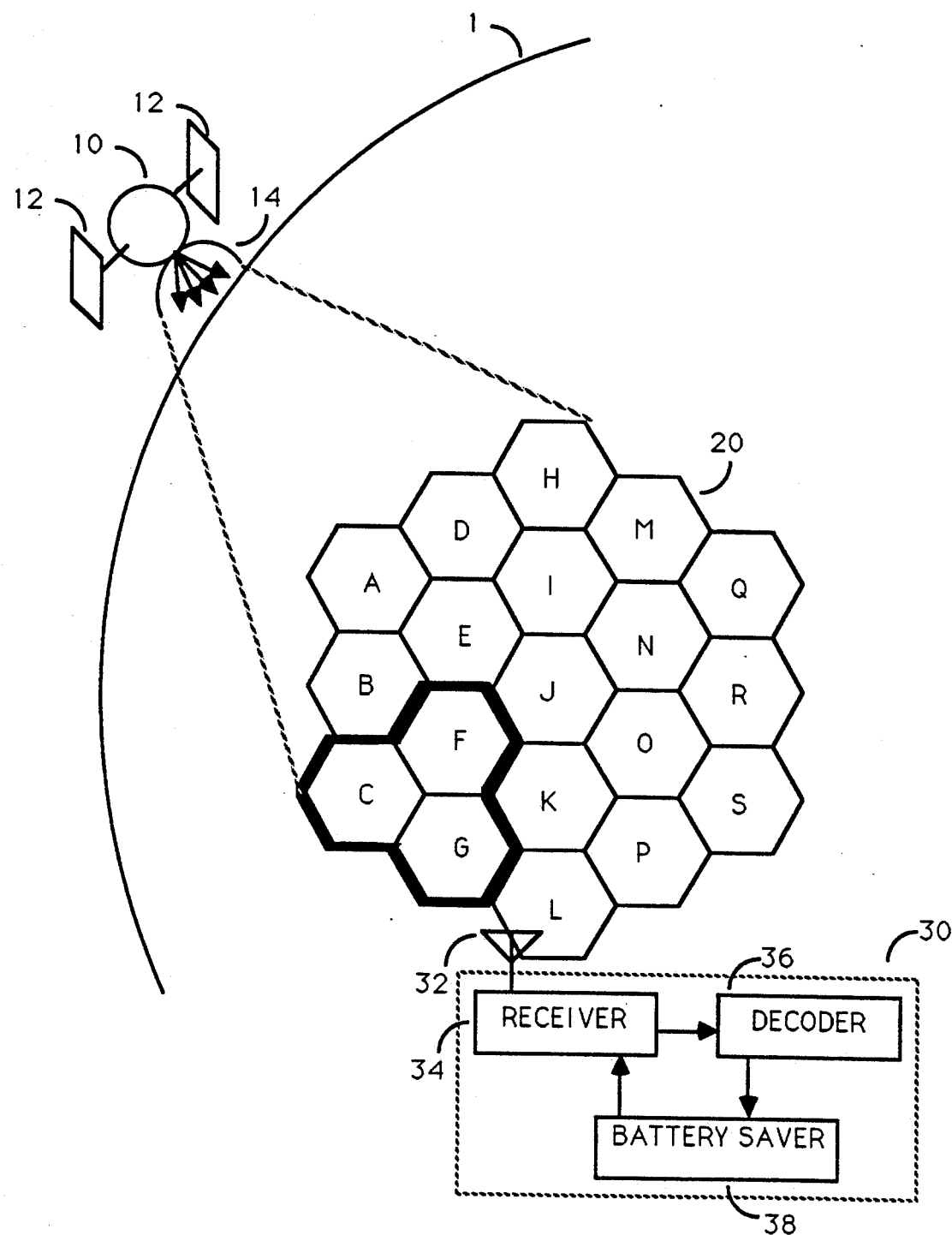
FIG. 1 shows an orbiting satellite selective call system operating in accordance with the present invention.

FIG. 1 shows an orbiting satellite selective call system operating in accordance with the present invention. In orbit above the Earth 1, is a satellite 10 which has solar collectors 12 for collecting solar power and storing the resulting electrical energy in internal batteries (not shown). The satellite receives signals from a ground based transmitter 18 and re-transmits the signals using a multi-lobe antenna 14. The signals to be transmitted are provided to the transmitter 18 by a paging terminal 16, as will be described in detail below. The each lobe of the multi-lobe antenna radiates a portion or a geographic area of the Earth. Antenna 14 is shown to have a pattern 20 having nineteen lobes A through S Alternate embodiments may have more or less lobes. There may exist a certain amount of radiation overlap between lobes Each lobe of the antenna may be selectively activated. The entire power of the satellite transmitter may be directed on a single lobe or divided among any number of lobes. Each lobe may radiate a large portion of the earth. For example, lobe L may radiate the entire Baltimore-Washington vicinity. In an alternate embodiment, geographic areas of the Earth may be covered by a satellite having multiple antennas for covering various geographic areas.

Within lobe "L" is shown a selective call receiver 30 which receives satellite signals transmitted therein. The selective call receiver includes an antenna 32 and a receiver 34 tuned to receive radio frequency signals from the satellite. The received and demodulated signals are then processed by a decoder 36 which may include a microcomputer. The receiver 34 may be tuned to one of a plurality of receive frequencies. Based on information within the received signals, battery saver 38 activates and deactivates the receiver in order to receive satellite signals and conserve battery power, respectively. A description of a pager which battery saves in response to received signals is included within U.S. Pat. No. 4,860,003 to DeLuca et al. and assigned to the assignee of the present invention is hereby incorporated by reference. Lobes C, F and G are shown enclosed in a bold line indicating that these lobes may be treated as a single lobe in an alternate embodiment.

Figure 2:
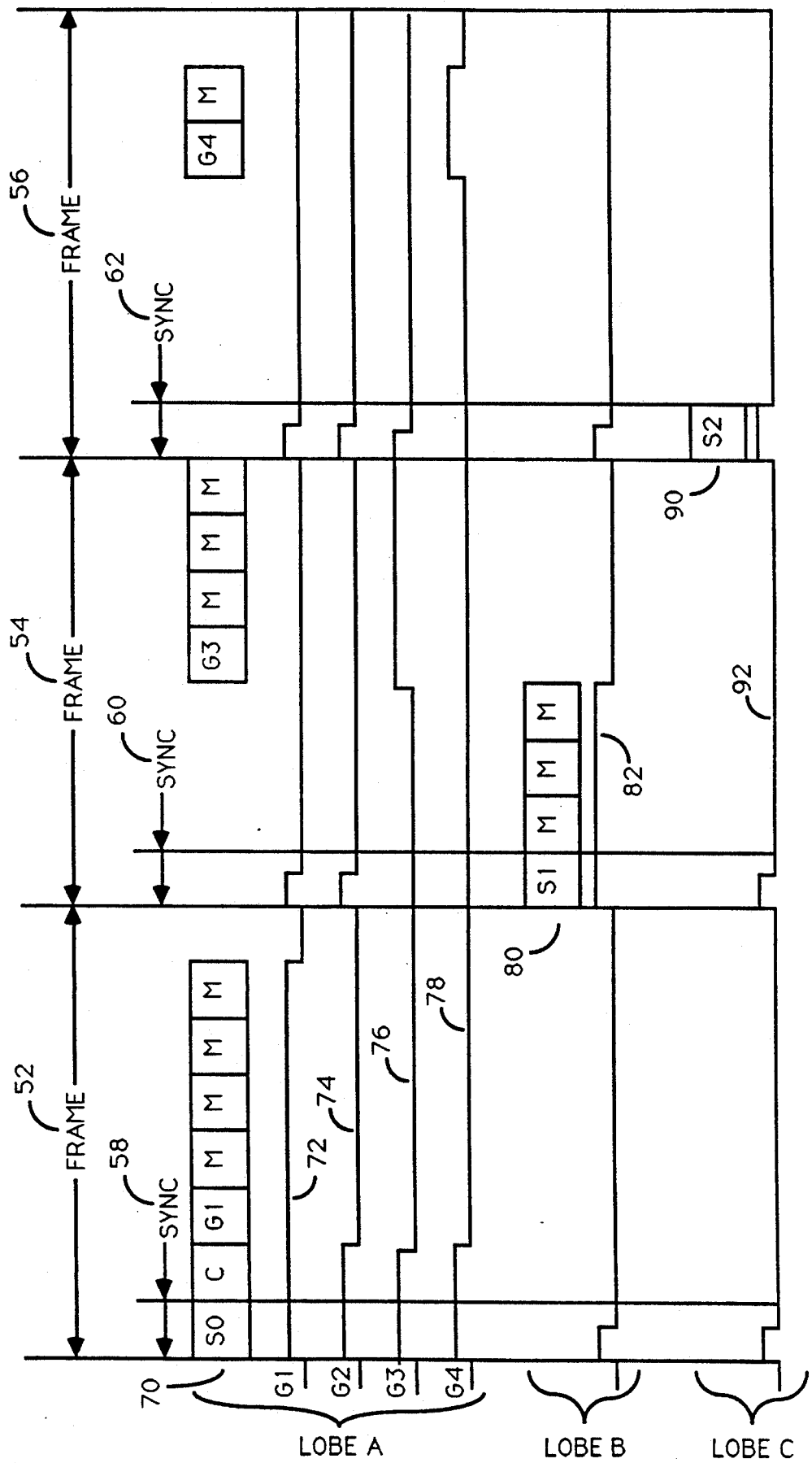
FIG. 2 shows satellite signals transmitted on three lobes and pager battery saving operations in response thereof.

FIG. 2 shows satellite signals transmitted on three lobes and pager battery saving operations in response thereof. Signals are divided into frames of equal time, 52, 54 and 56. Each frame potentially begins with a synchronization signal 58, 60 and 62. During the first frame shown in FIG. 2, the signal on lobe A, shown by line 70, begins with a signal "S0", which indicates that a command signal "C" follows thereafter. The command signal includes a signal defining the time and/or frequency carrier on which various group signals G1, G3 and G4 occur within the forthcoming frames Thus the command signal is indicative of the occurrence of the various group signals. For the sake of explanation, assume that the system is a single carrier frequency system and each frame is divided into eight equal portions or blocks, the first portion or block being the synchronization signal and the subsequent seven blocks being data blocks Thus the command signal occurs within the second block of the first frame. The G1 signal occurs beginning at the third block of the first frame 52 and a signal within the command signal indicates such. Furthermore, G3 signals occur beginning at the fifth block of the second frame 54, and G4 signals occur beginning at the sixth block of the third frame 56, and signals within the command signal indicate such.

Lines 72, 74, 76 and 78 indicate battery saving strobes for the groups of pagers which receive signals transmitted on lobe A. A "high" state indicates the receiver is active and the satellite signal is being processed, while a "low" state indicates that power is being conserved by not receiving and processing the satellite signal. Lines 72–78 show that all groups of pagers are receiving and processing the synchronization and control signals during the first frame 52. G1 pagers continue to receive and process the G1 signal after the command signal in response to information therein, while G2, G3 and G4 pagers battery save after the command signal. Within the G1 signal is a synchronization signal, a signal identifying G1, and a signal indicative of the length of the following message information, in this case, four message blocks. Correspondingly, line 72 shows the G1 pagers receive and process the message blocks within the first frame.

During sync signal 60, G1 and G2 pagers perform receiving and processing operations during at least a portion of the expected sync signal. However, no signal is transmitted within lobe A, and upon detecting the absence of a sync signal, power is conserved. Since the command signal indicated no subsequent signals for G1 and G2 pagers, signal is searched for during interval 60. However, since the command signal indicated that G3 and G4 signals were in subsequent frames, lines 76 and 78 show that G3 and G4 pagers conserve power during interval 60.

The command signal indicates that the occurrence of G3 signals begins with the fifth block of the second frame 54. Line 76 indicates that G3 pagers, in response to the command signal, begin receiving and processing satellite signals at that time. The G3 signal begins with a synchronization signal followed by a G3 group ID signal and followed by a signal indicating that the next three blocks contain message information for G3 pagers. G3 pagers remaining actively receiving and processing message information during that interval as shown by line 76.

During sync signal 62, G1, G2 and G3 pagers receive and process during at least a portion of the expected sync signal. However, no signal is transmitted within lobe A, and upon detecting the absence of a sync signal, power is conserved. Since the command signal indicated no subsequent signals for G1, G2 and G3 pagers, signal is searched for during interval 62. However, since the command signal indicated that a G4 signal is in a subsequent frame, line 78 shows that pagers conserve power during interval 62.

The command signal indicates that the occurrence of G4 signals begins with the sixth block of the third frame 56. Line 78 indicates that G4 pagers, in response to the command signal, begin receiving and processing satellite signals at that time. The G4 signal begins with a synchronization signal followed by a G4 group ID signal and followed by a signal indicating that the next block contains message information for G4 pagers. G4 pagers remain actively receiving and processing message information during that interval as shown by line 78.

In a multiple frequency embodiment, the G4 and G5 signals could have occurred on different frequencies. The frequency of occurrence would be indicated by the command signal. Pagers receiving either the G4 or G5 signals would switch to the appropriate frequency prior to the corresponding signals.

Lines 80 and 90 show satellite signals transmitted on lobes B and C of the satellite, respectively, and lines 82 and 92 show battery saver strobes of paging receivers receiving satellite signals on lobes B and C, respectively. During sync signal 58, lobe B and lobe C pagers receive and process during at least a portion of the expected sync signal. Since the signal is transmitted within lobe A, lobes B and C pagers receive no signal. Upon detecting the absence of a sync signal, power is conserved as shown by lines 82 and 92.

During sync signal 60, lobe B and lobe C pagers receive and process during at least a portion of the expected sync signal. Since the signal is transmitted within lobe B, lobe C pagers receive no signal. Upon detecting the absence of a sync signal, power is conserved as shown by line 92. However, lobe B pagers receive an S1 signal which includes a synchronization signal and a signal indicating that all groups of pagers within the second lobe are to search the next three message blocks for message information. Battery saver strobe of line 82 further indicates that all groups of lobe 2 pagers remain active for the three message blocks in the second frame 54.

During sync signal 62, lobe B and lobe C pagers receive and process during at least a portion of the expected sync signal. Since the signal is transmitted within lobe C, lobe B pagers receive no signal. Upon detecting the absence of a sync signal, power is conserved as shown by line 82. However, lobe C pagers receive an S2 signal which includes a synchronization signal and a signal indicating that no message information will be transmitted to lobe C pagers. Battery saver storage of line 92 further indicates that all groups of lobe C pagers conserve power after interval 62. The S3 signal refreshes the synchronization of pagers during low activity periods.

FIG. 2 shows that the satellite transmitter transmits selectively on lobes in order to provide battery saving synchronization to pagers, and selectively send messages to all pagers within a lobe, or divide the pagers within a lobe into groups in order that pagers may conserve power while a large amount of information is being transmitted within the lobe. In another embodiment of the present invention, the command signal "C" further informs groups of pagers of the frequency upon which group signals are modulated, in response to which, the group of pagers would receive and process on the designated frequency in coincidence with the designated occurrence. In varying embodiments of the invention, the relative size of a synchronization signal may be varied with respect to command, group and message signals. Furthermore, message signals may consist of a number of interleaved data words. Additionally, in the example of the signal shown in the first frame 52 of lobe A, the G1 signal may be eliminated by incorporating necessary information for G1 pagers in the command signal.

The synchronization signals are shown consecutively transmitted in lobes A, B and C. In one embodiment, the synchronization signals are consecutively transmitted on every lobe of the antenna shown in FIG. 1. In such an embodiment, a satellite has a predetermined number of lobes. A pager may, in this example, expect a synchronization signal only once every 19 of the frames. Thus the pager could further conserve power during the intervening 18 frame sync intervals.

In yet another embodiment, the synchronization signals could be distributed between lobes as required. Thus a large city could be within a lobe and thus could have synchronization signals and subsequent traffic control signals more often transmitted therein Pagers in this embodiment would search the beginning of every frame for a synchronization signal as shown by FIG. 2. Pagers of either embodiment would attempt to re-acquire synchronization if a synchronization signal were not detected within a predetermined amount of time, wherein the predetermined amount of time may be varied from pager to pager or lobe to lobe and may be programmed into the codeplug of the pager.

In yet another embodiment, multiple lobes may be combined. In such a combination, the total power to the combined lobes would be limited to the transmit power of the satellite, thus the transmission power to a single lobe would be decreased. In order to compensate for the decrease in signal power, the data rate of the transmission may be decreased. Thus for example, lobes A and B of FIGS. 1 and 2 could correspond to areas having large cities, each lobe being independently activated and signals transmitted at a first data rate of 4800 baud. However, lobes C, F and G of FIG. 1 could correspond to an area having a low population. Thus these lobes could be treated as a single lobe having three times the area and having data transmitted at one third the data rate, 1600 baud in the example. A pager could determine which type of lobe in which it is operating by activating at the expected beginning of each 4800 baud frame and determining the data rate of the information received in the sync signal. If 4800 baud data were detected, the pager would decode information at 4800 baud, while if 1600 baud were detected, the pager would decode information at 1600 baud. A pager capable of detecting various baud rates and responding to protocol changes in response thereof is disclosed in U.S. Pat. No. 4,829,466 to Davis et al. This patent is assigned to the assignee of the instant invention and is hereby incorporated by reference.

An example of an application of the aforementioned embodiment results in each area covered by a lobe of the satellite to have a varying data rate depending upon the demand for messaging in area. For example if areas C, F and G all had substantially few messages, the areas could be combined and messages transmitted to all three areas at 1600 baud. However, if the message requirements for area G increased substantially (perhaps an emergency situation such as a fire had arisen, or several very long messages were to be transmitted), messages could be transmitted to area G only at 4800 baud, thereby providing area G with the additional message capacity on an "as required" basis.

In another example, if a very important message were not being received by a pager in a 4800 baud area, the data rate could be reduced to 1600 baud while maintaining the transmitted power to the area. This would improve the probability that the important message were received by improving the message sensitivity of the system.

The selective use of antenna lobes by the satellite allows the satellite to conserve power. Only areas requiring messages are transmitted to. Thus the satellite does not expend power transmitting to areas where messages are not to be received by selective call receivers. The focusing of the power allows for less power to be consumed by the transmitter than if the satellite were to cover the entire area of lobes A-S with a single lobe. Furthermore, aside from periodic transmission of synchronization signals, if messages are not to be transmitted, the transmitter may be disabled, thereby conserving additional power at the satellite.

Figure 3:
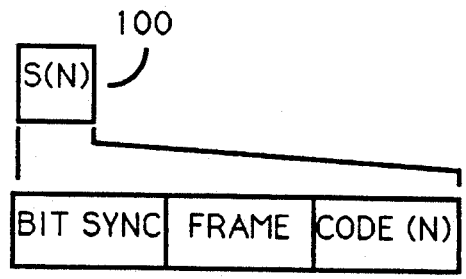
FIG. 3 shows the structure of signals transmitted by the satellite.
Figure 3:
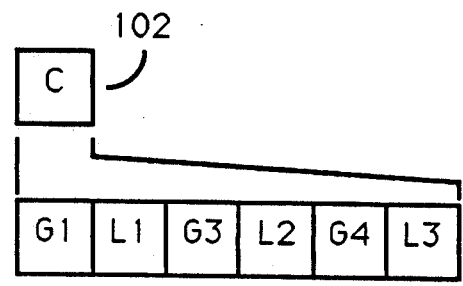
Figure 3:
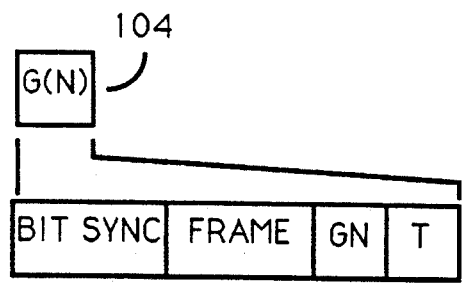
Figure 3:
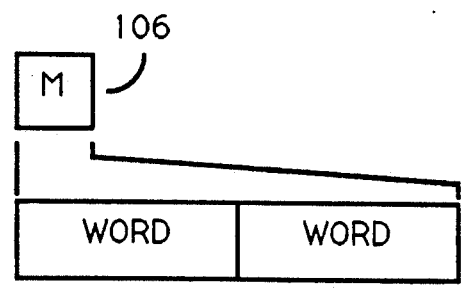

FIG. 3 shows the structure of signals transmitted by the satellite. The synchronization signal "S(N)" 100 comprises a bit synchronization portion having a number of bit transitions at the data rate of the signal. The frame synchronization portion comprises a predetermined bit sequence which defines the bit boundary for the beginning of words within the signal, and a code word indicating the type of synchronization signal. An S(0) signal indicates that a command signal follows, while an S(1) indicates that message information for all groups on the lobe follows, and an S(2) signal indicates that no message information follows.

The command signal "C" shown by 102, comprises a plurality of group signals followed by corresponding to location signals In accordance with the embodiment of FIG. 2 line 70, the L1 signal would indicate that the G1 messages began in the second block after the S0 command. The L3 signal would indicate that the G3 messages began in the twelfth block after the S0 signal, and the L3 signal would indicate that the G4 messages began in the 21st block after the S(0) command. The L signals could alternately indicate the time of the occurrence, the number of bits or words before the occurrence or the portion of a frame of the occurrence of the corresponding group, and/or the frequency on which the messages occur. Further note that the command signal may be extended in length to account for any number of groups by use of a continuation signal, each command signal, or a signal within the S(0) command indicating the length of the command signal.

The group signal "G(N)" precedes each group of messages and includes bit and frame synchronization signals as well as a signal corresponding to the group. Furthermore, a "T" signal indicates the length of the group message transmission following the group signal. The "T" signal may indicate the length of the entire message transmission, the location of the address within the transmission, or the number of addresses within the transmission in the event the addresses are placed in the first portion of the message transmission. The "T" signal may alternately be incorporated into the command signal. The synchronization signals within the group signal allow the groups to occur substantially far from the S0 signal by providing a means for the pager to re-acquire synchronization to the satellite signal The message signal "M" is shown to include two words having either message or address information. In alternate embodiments, any number of words may be contained within the message signal, and the message signal may be interleaved to prevent errors in reception caused by signal fading.

In an alternate embodiment, the bit, frame and/or group signals may be eliminated on a message group whose occurrence is indicated by the S0 command. Thus only message information need be included at the occurrence indicated by the command signal. Bit synchronization may be maintained from the sync and S0 signals, or re-acquired on data occurring prior to the message group. Framing and group ID information may be maintained from the sync and S0 signals.

Figure 4:
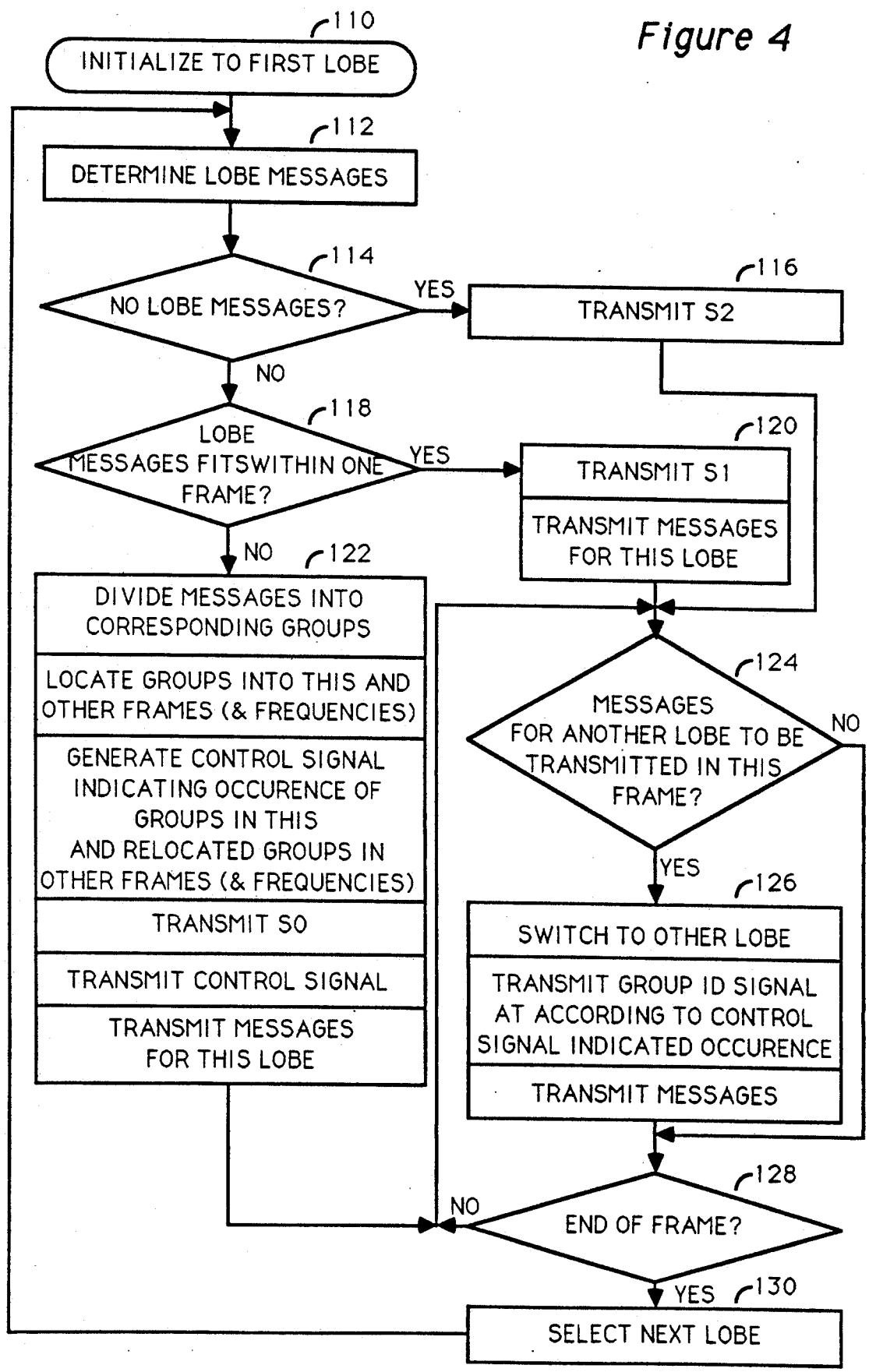
FIG. 4 shows a flowchart of a pager transmitter system including a satellite operating in accordance with the present invention.

FIG. 4 shows a flowchart of a pager transmitter system including a satellite operating in accordance with the present invention. In step 110, the system is initialized to transmit on the first lobe. Then step 112 determines messages to be transmitted on the selected lobe. Then step 114 determines if no messages are to be transmitted on the selected lobe, in response to which step 116 transmits a S2 signal at the beginning of the frame on the selected lobe. If step 114 is false, step 118 checks if messages within this lobe may be transmitted within the available frame capacity of the lobe. If true, step 120 transmits an S1 signal and the messages for the lobe. If step 118 was false, step 122 divides the messages for the lobe into corresponding groups, locates the groups into this and following frames (and corresponding frequency). Locating groups into following frames reduces the available frame capacity checked in subsequent executions of step 118. The step then generates a control signal indicating the occurrence of the located groups, transmits an S0 synchronization signal followed by the control signal and then transmits the messages for the lobe. After completion of either step 116, 120, or 122, step 124 checks if messages for another lobe are to be transmitted in this frame. If true, this would correspond to a prior execution of step 122, and step 126 switches the antenna to transmit on the other lobe, then transmits the group signal at the occurrence corresponding to the prior control signal and then transmits the messages. Then from either step 124 or 126, step 128 checks if the frame has ended. If not step 126 may again be executed in order to transmit message information on yet another lobe. When the end of the frame is reached, step 130 selects the next lobe, being the lobe subsequent to the lobe selected in the previous execution of step 112, or the lobe requiring the most traffic in another embodiment.

Figure 5:
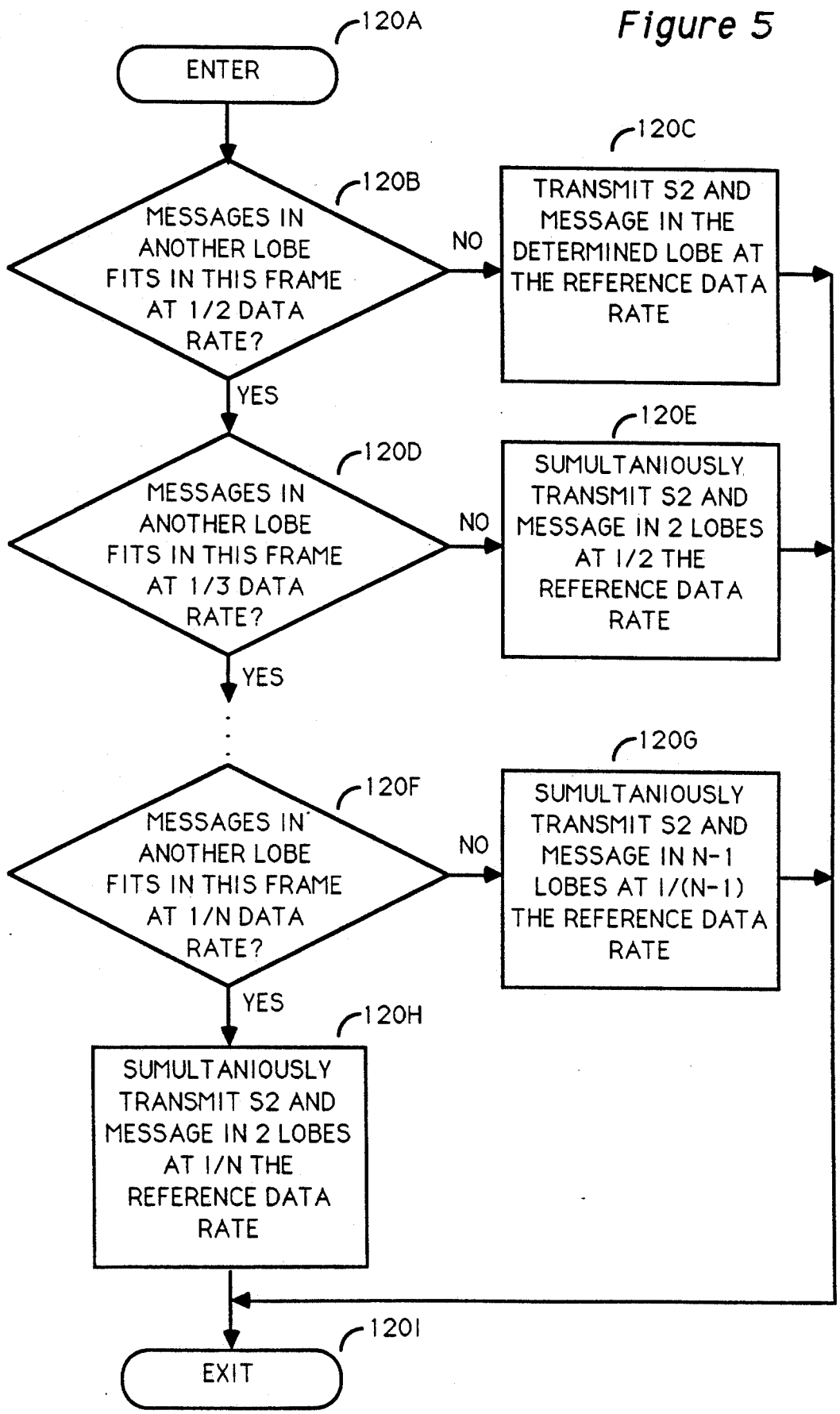
FIG. 5 shows a flowchart detailing an embodiment of the invention wherein a plurality of areas may be simultaneously transmitted to at a varying data rate

FIG. 5 shows a flowchart detailing an embodiment of the invention wherein a plurality of areas may be simultaneously transmitted at a varying data rate. The steps of FIG. 5 correspond to an alternate implementation of the step 120 of the flowchart of FIG. 4. The flowchart is entered at step 120A. At step 120B messages in another lobe are checked to see if they may be combined with the messages of this lobe, and all the messages transmitted at a reduced data rate. The reduced data rate corresponds to one half of the data rate of the single lobe transmission. If false, step 120C transmits the S2 command and the messages at the reference data rate. If the result of step 120B was true, at step 120D messages in yet another lobe are check to see if they may be combined with the messages of the preceding two lobes, and all the messages transmitted at one third the data rate of the single lobe transmission. If false, step 120E transmits the S2 command and the messages at the reference data rate on two of the corresponding lobes at one half the reference data rate. The process continues for N lobes as shown by steps 120F, 120G and 120H.

Finally, at step 120I, the process exits to step 124 of FIG. 4. FIG. 5 shows that lobes are combined and the data rate of the transmission is reduced until the frame is filled with data. FIG. 1 shows this embodiment combining lobes C, F, and G with the aforementioned method Although preferable, it is not necessary for the combined lobes to be adjacent lobes, for example lobes C, I, J and P could be combined at a different time.

Figure 6:
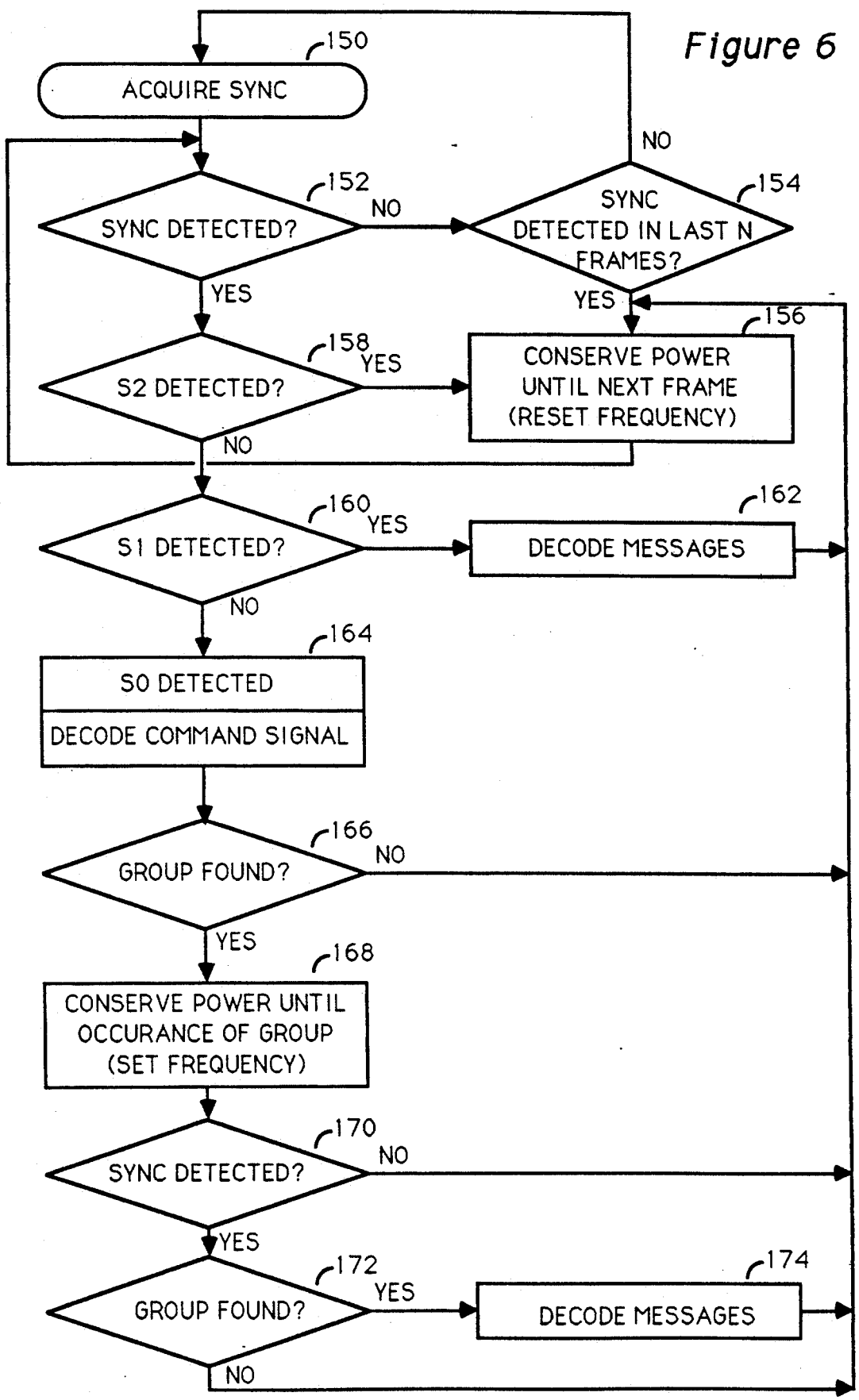
FIG. 6 shows a selective call receiver operating in accordance with the present invention.

FIG. 6 shows a flowchart for selective call receiver operating in accordance with the present invention. Beginning with step 150, synchronization is acquired using methods known in the art. Step 152 checks if sync has been found; if not, step 154 checks if sync has been found in the last N frames, where N is a predetermined value. If not, the pager is out of sync and step 150 is returned to. If sync was not detected in this frame, and was detected in a previous frame step 156 is executed, wherein power is conserved until the beginning of the next frame where sync is again searched for in step 152. If sync is found in step 152, step 158 determines if S2 was detected. If true, no message signals follow and step 156 conserves power until the beginning of the next frame. If S2 was not found, step 160 checks for the detection of S1. If detected, step 162 decodes messages found in that frame. If false, S0 is detected and the subsequent command signal is decoded. Step 166 checks if a group signal corresponding to a predetermined group signal assigned to the pager is found within the command signal. If not found, there are no messages for that group and step 156 is executed. If the group signal is found, step 168 conserves power until the occurrence of the group and then in step 170 power conservation stops, a signal is again searched for and the synchronization signal is again performed. If synchronization was unsuccessful, step 156 is executed. If sync is acquired, step 172 checks if a group ID corresponding to the predetermined group assigned to the pager is again found. If not found, step 156 is executed; if found, step 174 decodes messages after the group signal.

The re-synchronization executed in step 170 allows the group of messages to occur at a time substantially after the occurrence of the command signal Re-synchronization allows for any data clock drift between the paging receiver and the transmitter to be compensated for. Thus a pager would begin to acquire synchronization prior to the expected occurrence of the synchronization signal in order to account for clock drift.

Figure 7:
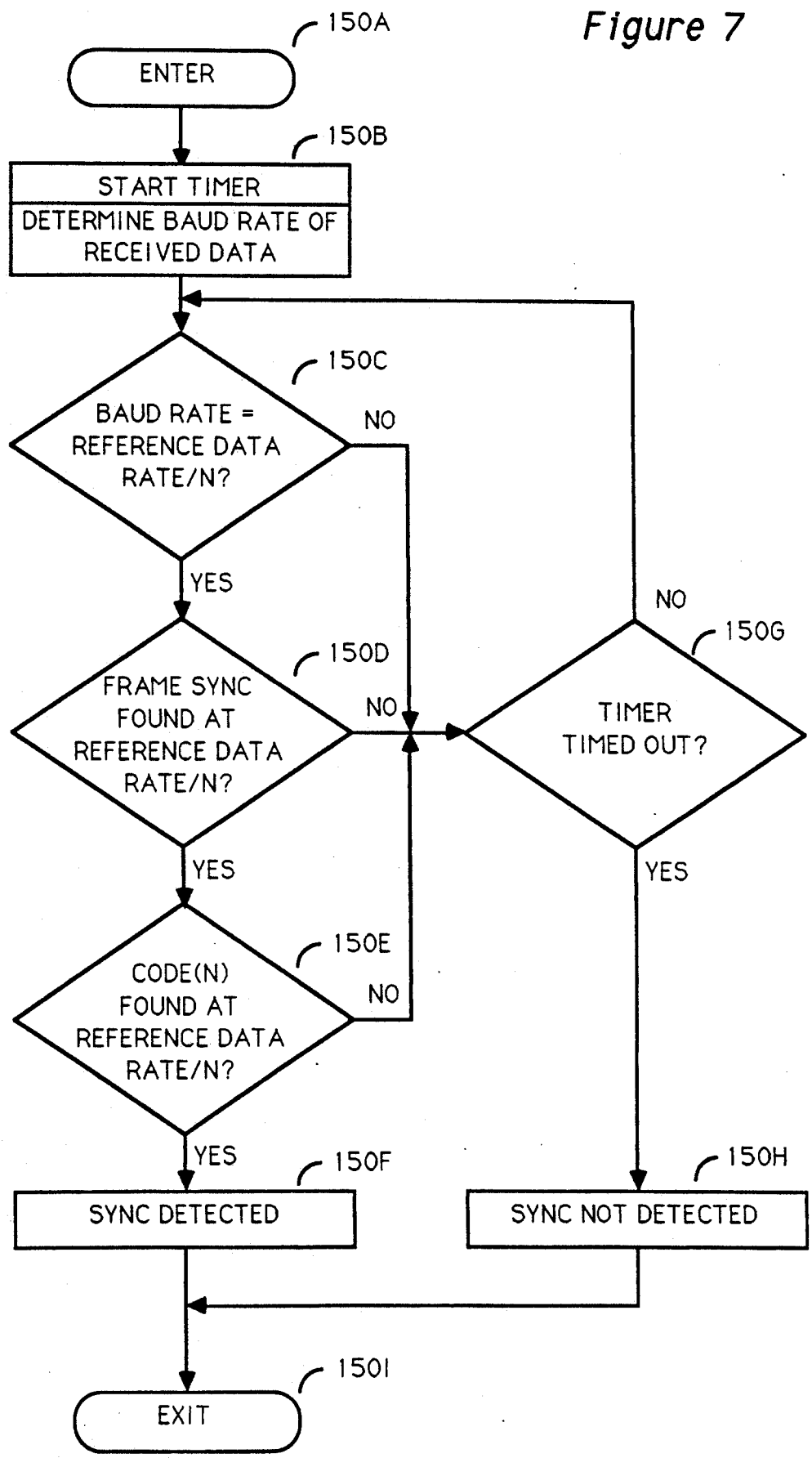
FIG. 7 shows a flowchart detailing an embodiment of the invention wherein a pager synchronizes to a varying data rate as described by FIG. 5.

FIG. 7 shows a flowchart detailing an embodiment of the invention wherein a pager synchronizes to a varying data rate as described by FIG. 5. The steps of FIG. 7 correspond to an alternate implementation of the step 150 of the flowchart of FIG. 6. The flow chart is entered at step 150A. In step 150B, a timer is started and the baud rate of the received data is determined. A pager capable of detecting various baud rates and responding to protocol changes in response thereof is disclosed in the aforementioned U.S. Pat. No. 4,829,466 to Davis et al. Step 150C determines if the baud rate corresponds to the reference data rate divided by an integer N. If true, step 150D determines if the frame sync signal 100 of FIG. 3 is found. If true, step 150E determines if code (N) signal 100 of FIG. 3 is found. If true, step 150 flags that synchronization has been found. If either steps 150C, 150D, or 150E are false, step 150G checks if the timer set by step 150B has timed out. If not, the process is repeated, if true, step 150H flags that sync has not been detected. Then from either step 150F or 150H, the flowchart exits to step 152 of FIG. 6.

Figure 8:
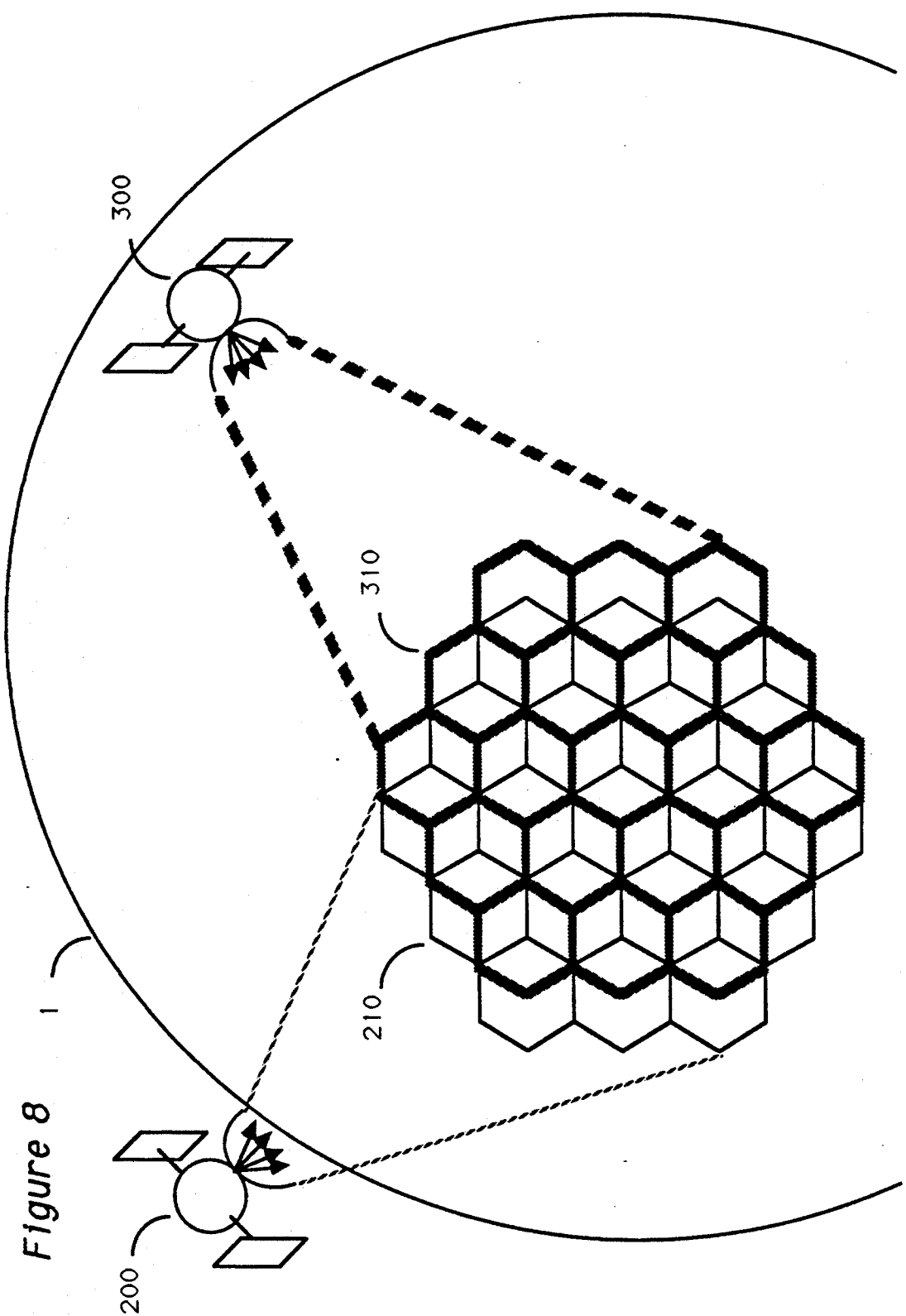
FIG. 8 shows a paging system having a plurality of satellites operating in accordance with the present invention.

FIG. 8 shows a paging system having a plurality of satellites operating in accordance with the present invention. Each satellite 200 and 300 has a plurality of lobes 210 and 310 correspondingly, and the lobes overlap. In such a system, one pager in one area may receive messages from either satellite, while conserving power in accordance with the prior description. In this embodiment, plurality of satellites transmit synchronization signals in substantial coincidence with each other and simultaneous transmissions do not occur in overlapping lobes of satellite antennas. Pagers could begin searching to the synchronization signal for each frame prior to the expected occurrence in order to provide for minor synchronization differences in the signals received from either satellite. An example embodiment includes satellites 200 and 300 which could sequentially transmit from lobes A through S (as shown by FIG. 1) wherein satellite 200 transmits on lobe A while satellite 300 transmits on lobe J, thereby preventing the transmission in a common area at the same time by both satellites. In still another embodiment, a complex control system could ensure that both satellites do not transmit into the same area at the same time, thereby permitting satellites to concentrate in areas having a lot of traffic. In still another embodiment, lobes shown covered by the second satellite may alternately be covered by at least one ground based paging transmitter.

In yet another embodiment, the overlap between satellites could be substantially less than the overlap shown by FIG. 8 thereby allowing the satellites to cover a greater area. This embodiment further provides for continuous coverage of an area when the satellites are not in a geo-synchronous orbit. In this embodiment, an area on the Earth is covered by varying lobes as a satellite moves over the area. As a first satellite leaves the area, a second satellite moves in range of the area and transmits synchronization signals in sync with the first satellite and subsequent messages as previously described. In yet another embodiment, the number of lobes for each satellite may be varied thereby providing for future enhancements in antenna lobe and satellite transmission technology. It should be further appreciated that the invention provides for system having at least one satellite. More satellites or ground based transmitters may be added to the system, thus more information may be transmitted to each area of the planet, while providing an efficient battery saving means for the ground based receivers.

Examples of contemplated embodiments are illustrated below.

EXAMPLE 1

Assume: SATELLITE IMPLEMENTATION
Single Channel System, 20 Watts RF Available
Preamble = 32 bit 1,0 pattern
Sync Word = 32,21 BCH code word.
32 Frame Numbers (#0-31)—can be represented by 5 bits within command
64 Pager Groups (#0-63)—can be represented by 6 bits within command
32 antenna lobes
In approximately 100 seconds one lobe is replaced by a second lobe.
Effect of earth rotation is negligible for this example (polar orbit)
Data Word = 32,21 BCH code word
Interleave Depth = 16 (Block = 512 Bits)
Bit Rate = 6000 BPS
N = number of frames per lobe = 2
Therefore: Block Length = 512 bits
Frame duration ~ 100 secs/2 ≈ 32
~1.5625 sec or 9375 bits
18 blocks per frame (can be represented by 5 bits within command) of data accounts for 9216 bits after preamble/sync, leaving 159 bits, less 64 for sync, leaving 95 additional bits for more preamble, offset sync B sequences or other uses.

Transmission time required per total cycle of frames under no traffic is due to preamble & sync only = 64 bits × 32 frames = 2048 bits = 0.34 sec out of 50 sec = 0.68%

Avg. Power—no traffic = 0.68% × 20 = 0.136 watts for 50 sec cycle time

Receiver Time (for 50 sec cycle time) = preamble + sync + uncertainty, wherein the uncertainty corresponds to the amount of time receiver activates prior to beginning of frame in order to account for clock skews and system sync inaccuracies.
= ~85 bits × 32 = 2720 bits = 0.453 sec = 0.91% or about 110X battery saving Note that Receiver looks for all frames to allow for movement to another area, shift to another coverage lobe and overlap of two satellite patterns. In many cases, receiver power can be saved by predicting which frames are of interest and only listening only to those frames.

The other end of the power use spectrum is approximated by 100% Satellite Power with no traffic in 31 lobes, all traffic in one lobe. Then:

Avg. Sat Power = ~100% = ~20 W

Receiver on time approximately equals:
32 frames × 85 bits for preamble searches
+ 1 frame × 1024 bits for command reception
+ 64 bits + 3 blocks × 512 bits for preamble & sync B and addresses (assuming no more than ⅓ of data is pager addresses, rest being message information)
= 2720 + 1024 + 1600 = 5344 = 0.891 sec = 1.78% of 50 seconds or about 55X battery saver ratio.

Traffic capability = ~18 × 512 × 32 bits per 50 sec = ~5898 bits/sec at 21 info bits per 32 bit word = 3870 info bits/sec.

EXAMPLE 2

Assume—As in example #1 except:
10 channel system—2 watts each.
Channels numbered 1 to 10
Channel #1 is control channel for system.
600 BPS per channel
Interleave depth = 4
N = 1
Therefore: Frame duration = ~100 sec + 32 = 3.125 sec = 1875 bits or 14 blocks of 128 bits each + 83 bits for preamble (32) + sync (32) + other (19).

Under no traffic conditions, the transmission time is 64 bits × 32 frames = 2048 bits = 3.4 sec out of 100 sec = 3.4%

Average Power (no traffic) = 3.4% × 2.0 = 0.068 watts (for 100 sec cycle time)

Receiver Time (with no special prediction capability)
= ~85 bits × 32 = 2720 bits = 4.53 sec = 4.5% or only = 20 battery saving ratio With only sync A satellite power in 31 lobes and all traffic in one lobe:
Average Sat Power ~ 20 watts Receiver On time approximately equals (less actual pages)

32×85 bits for preambles
+1×1024 bits (or more) for commands
+64+2×128 bits for addresses
=2720+1029+320=4064=6.77 sec=6.77% of 100 seconds or battery saving ratio =16

Traffic capability=~14×128×32 bits×10 channels/100 sec=5734 bits/sec

In summary of the Satellite Examples 1 & 2, the 6000 bit single channel approach allows better response time and receiver battery saving at comparable total throughputs and transmitter powers than the 600 bit 10 channel approach. Both can use the same basic protocol.

EXAMPLE #3

Assume: Terrestrial Land Based Transmitting System
1 Frame number
64 Pager Groups
25 second period
N=1
Bit Rate=6000 BPS
Interleave Depth=4
Transmitter Power & Time not of interest
Therefore: In the no traffic case
Receiver Time=preamble+sync+uncertainty
=85 bits every 25 seconds
=0.0142 seconds per 25 seconds
=0.057%
or Battery Saving Ratio=1765 to 1
In the full traffic case:
Average Receiver On-Time=
~1×85 bits for preamble
+~1024 for commands
+6×128 for addresses
=1877 bits per 25 sec
=0.313 sec per 25 sec
=~1.25% or Battery Saver Ratio=~80

The invention has described by way of example. It is to be understood that numerous modifications may be made to the examples given herein while remaining within the scope of the invention which is defined by the following claims.

Figure 9:
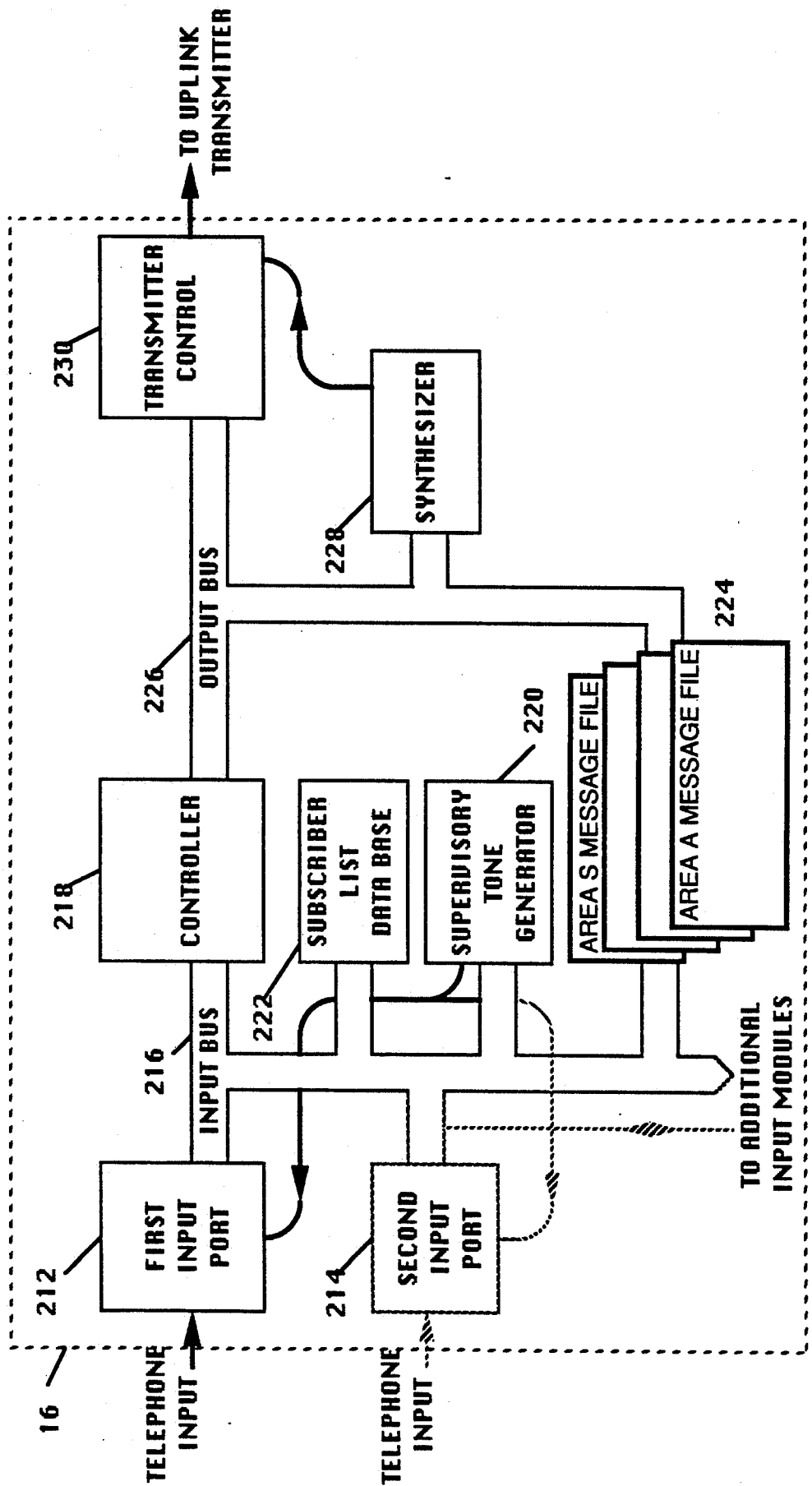
FIG. 9 is an electrical block diagram of a paging terminal suitable for use with the satellite selective call system of the present invention.

Reference is now directed to FIG. 9 which shows a block diagram of the terminal 16 utilized in the preferred embodiment of the present invention. In general, the operation of paging terminals is well known to one of ordinary skill in the art, so only a brief description of the operation is being provided. One or more input ports 212 and 214 are connected to the telephone system enabling a message origination device, such as a telephone or an alphanumeric entry device, access to the paging terminal 16. When a call is received by the paging terminal 16, an output is generated on a digital input bus 216 which is coupled to a controller 218. The controller 218, through the digital input bus 216, enables a supervisory tone generator 220 to generate an acknowledgment tone which is coupled to, for example, the first input port 212. This tone is communicated to the caller through the telephone circuit and indicates that the paging terminal 16 is ready to accept the pager number of the pager to be paged. The address is entered as a DTMF tone sequence from a touch-tone telephone, and when received through the first input port 212, is processed by a DTMF to binary converter to provide the digital data to be processed by the controller 218. The controller 218 checks the received pager number with a subscriber list data base 222 to determine the actual pager address code to be transmitted to the selected pager, any group affiliation and the geographic area where the pager is located. The subscriber list data base 222 is generally a nonvolatile memory such as a hard disk or EEPROM memory which may be periodically altered and updated as required for the number of subscribers in the system. The controller 218 through the supervisory tone generator 220 then generates a second acknowledgment tone indicating to the caller to enter the message, which is generally the phone number of the caller's touch-tone telephone. It will be appreciated by one of ordinary skill in the art that voice lead through responses may be generated in lieu of acknowledgment tones directing the caller to enter the pager number and message. The caller's message is initially stored by the controller 218 in a message queue which comprises a number of message files 224, each file corresponding to a predetermined geographic area in which the pager user to which the message is directed is located. As the message queues are developed, the controller 218 monitors the number of messages being stored so as to enable the optimization of message transmissions throughout the system, as described above. At predetermined time intervals, the controller 218 then sequentially recovers the message information for each geographic area, and routes the message information through a digital output bus 226, to a synthesizer 228. The synthesizer encodes the address and message information into the proper digital sequence required for transmission, and also adds the control information, described in FIG. 2, which is utilized to control the message transmissions by the satellite 10. The digital sequence is outputted to a transmitter controller 230 which is coupled to a transmitter 18 which transmits the encoded information to the satellite 10, as shown in FIG. 1. The satellite 10 then transmits the message information to the appropriate geographic areas in response to the control information received.

Figure 10:
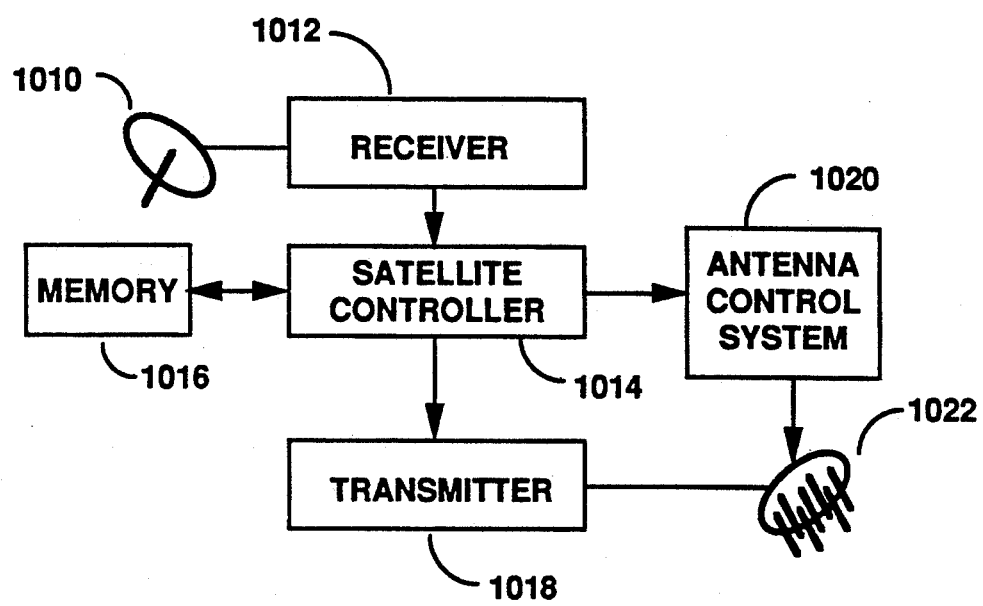
FIG. 10 is an electrical block diagram of the satellite suitable for use with the satellite selective call system of the present invention.

FIG. 10 is a block diagram of the satellite utilized in the preferred embodiment of the present invention. The message information signal transmitted from the ground based transmitter 18 is intercepted by the uplink antenna 1010 which couples the signal to the input of a receiver 1012. The recovered message information is coupled to the satellite controller 1014 which directs the information to a memory 1016 for temporary storage until the appropriate transmission time. During each message transmission cycle, the message information is recovered from the memory 1016 by the controller 1014 and is directed to the modulation input of a transmitter 1018. The output of the transmitter 1018 is coupled to a downlink antenna, such as a phased array antenna 1022. An antenna control system 1020, which includes preferably an electronic scan controller coupled to the phased array antenna 1022, is used to provide rapid steering of the message information transmission to the different geographic areas under the control of the satellite controller 1014.

While the downlink antenna provides sequential message information transmission to each of the various geographic areas, the actual transmission are controlled by the control information provided int he message information. The satellite controller 1014 evaluates the control information transmitted with the message information directed to each geographic area to determine how the transmission is to be handled. When the control signal indicates no information is present for a particular geographic area, the geographic area is selected with the downlink antenna 1022, and only the control signal is transmitted directing the pagers within that geographic area to shut down early, as described above. When the control signal indicates that the message information to be transmitted will require the complete time interval assigned to a particular geographic area, the geographic area is selected with the downlink antenna 1022, and the control and message information is transmitted to the pagers within the particular geographic area. When the control information indicates additional message information will be transmitted to a first geographic area during at least a portion of the time interval established for message transmission to a second geographic area, the downlink antenna 1022 first selects the first geographic area to enable message transmissions during the designated transmission time interval, and then selects the second geographic area to enable message transmissions there. Following the message transmission in the second geographic area, the first geographic area is again selected by the downlink antenna 1022 to complete the message transmissions in the first geographic area during the remainder of the time interval generally designated for the second geographic area. The operation of the paging receivers within each of the geographic areas is as described above.

What is claimed is:

1. A satellite based transmission system including a satellite having a directing means for directing, in a predetermined sequence, the synchronous transmission of selective call messages to a plurality of geographic areas corresponding to a sequence of transmission time intervals, said satellite based transmission system comprising:
   means for identifying message traffic levels for selective call receivers operating in each of the geographic areas, and for generating at least a first receiver control signal in response thereto when the message traffic level for a particular geographic area exceeds a predetermined message traffic level;
   means for encoding the selective call messages to include the first receiver control signal; and
   means for transmitting the selective call messages to the satellite;
   the directing means being responsive to the first receiver control signal for directing to the particular geographic area the transmission of a portion of the selective call messages directed thereto during at least a portion of the transmission time interval assigned for another geographic area.

2. The satellite based transmission system according to claim 1 wherein the selective call receivers operating in any particular geographic area are divided into a plurality of groups, and wherein the first receiver control signal includes information identifying the groups to which selective call messages are to be directed.

3. The satellite based transmission system according to claim 1 wherein the selective call receivers operating in any particular geographic area are divided into a plurality of groups, and wherein the first receiver control signal includes information identifying the groups to which selective call messages are to be directed and further identifies another geographic area to establish the transmission time interval for receiving the portion of the selective call messages directed thereto.

4. The satellite based transmission system according to claim 1 wherein the first receiver control signal includes information identifying the other geographic area to establish the transmission time interval for receiving the portion of the selective call messages directed thereto.

5. The satellite based transmission system according to claim 1 wherein the selective call receivers include a battery saving function, and wherein the selective call receivers in the particular geographic area are responsive to the first receiver control signal for supplying power to the receivers during the time intervals assigned thereto, and further during the portion of the time interval assigned for the other geographic area to receive the selective call messages directed thereto.

6. The satellite based transmission system according to claim 1 wherein the receiver control signal is a synchronization signal preceding the selective call message, for maintaining synchronization between the satellite transmissions selective call receivers.

7. The satellite based transmission system according to claim 1, wherein said means for identifying message traffic levels generates a second receiver control signal when there is no message traffic for the particular geographic area.

8. The satellite based transmission system according to claim 7, wherein the selective call receivers include a battery saving function responsive to the second receiver control signal to enable operation of the battery saving function following the reception of the second receiver control signal.

9. The satellite based transmission system according to claim 7, wherein said means for identifying message traffic levels generates a third receiver control signal when the message traffic level is less than the predetermined message traffic level for the particular geographic area.

10. The satellite based transmitter according to claim 9, wherein the selective call receivers include a battery saving function responsive to the third receiver control signal to disable operation of the battery saving function following the reception of the third receiver control signal during the transmission time interval corresponding to the particular geographic area.

11. The satellite based transmission system according to claim 1 wherein the satellite further comprises an antenna having a plurality of lobes, wherein each lobe defines a geographic area, and wherein the directing means selects the geographic area for selective call message transmission by selecting the corresponding lobe of said antenna.

* * * * *